United States Patent
Weber

(10) Patent No.: US 6,173,560 B1
(45) Date of Patent: Jan. 16, 2001

(54) CHAIN LINK OF DIFFERENT MATERIALS AND METHOD FOR ITS PRODUCTION

(75) Inventor: Willibald Weber, Netphen (DE)

(73) Assignee: Kabelschlepp GmbH, Siegen (DE)

(*) Notice: Under 35 U.S.C. 154(b), the term of this patent shall be extended for 0 days.

(21) Appl. No.: 09/308,147

(22) PCT Filed: Oct. 14, 1997

(86) PCT No.: PCT/EP97/05641

§ 371 Date: May 13, 1999

§ 102(e) Date: May 13, 1999

(87) PCT Pub. No.: WO98/22728

PCT Pub. Date: May 28, 1998

(30) Foreign Application Priority Data

Nov. 15, 1996 (DE) ................................ 196 47 322

(51) Int. Cl.[7] .................................................. F16G 13/00
(52) U.S. Cl. ................... 59/78.1; 59/900; 248/49
(58) Field of Search ...................... 59/78.1, 900; 248/49, 248/51

(56) References Cited

U.S. PATENT DOCUMENTS

| | | |
|---|---|---|
| 3,664,619 | 5/1972 | Heidrich et al. . |
| 4,625,507 | 12/1986 | Moritz et al. . |
| 5,020,313 | 6/1991 | Moritz et al. . |
| 5,278,641 | 1/1994 | Sekizawa et al. . |

FOREIGN PATENT DOCUMENTS

| | | |
|---|---|---|
| 19 32 428 | 1/1971 | (DE) . |
| 195 12 088 | 10/1996 | (DE) . |
| 195 44 931 | 6/1997 | (DE) . |
| 0 154 882 | 9/1985 | (EP) . |
| 0 415 029 | 3/1991 | (EP) . |
| 0 457 537 | 11/1991 | (EP) . |
| 456537 A1 | 11/1991 | (EP) . |

*Primary Examiner*—David Jones
(74) *Attorney, Agent, or Firm*—Alston & Bird LLP

(57) ABSTRACT

A chain link for an energy conducting guide chain which comprises two spaced apart and parallel side plates (2) which are connected together by at least one transverse portion. Each chain side plate (2) has a pivotal connecting portion (5) and a receiving means (7) for the pivotal connecting portion. The chain side plate also has an abutment (9). The chain link comprises a first plastic material. In the chain link according to the invention it is proposed that it has at least one region with an insert (13, 15) which forms at least a part of a surface of the chain link. The insert (13, 15) comprises at least one second plastic material which is different from the first plastic material of the chain link. The insert (13, 15) is connected to the chain side plate (2) by way of connecting elements (14, 17) in accordance with the two-component injection procedure.

22 Claims, 2 Drawing Sheets

CHAIN LINK OF DIFFERENT MATERIALS AND METHOD FOR ITS PRODUCTION

BACKGROUND OF THE INVENTION

The invention concerns a chain link and a process for the production of a chain link.

Movable items of equipment and machines are supplied with consumables of all kinds by way of lines which are guided in an energy guide chain. An energy guide chain includes a plurality of pivotably interconnected chain links. It is known for chain links of an energy guide chain to comprise a plastics material. A chain link has two chain side plates which are connected together by at least one transverse portion. The transverse portion can be formed integrally with the chain side plates. To form a pivotal connection between adjacent chain links each chain side plate has a pivotal connecting portion which engages into a corresponding receiving means in a chain side plate of an adjacent chain link. At least one chain side plate has at least one abutment to limit the angle of pivotal movement between adjacent chain links.

During operation of an energy guide chain the parts of the adjacent chain links, which are movable relative to each other, suffer from wear. Wear of the pivotal connecting portion and the receiving means in which the pivotal connecting portion is arranged can result in the function of the energy guide chain being adversely affected.

U.S. Pat. No. 4,625,507 B1 discloses a proposal in regard to the design configuration of an energy guide chain in which, in addition to the surfaces which are in mutual contact between the pivotal connecting portion and the receiving means for same, there is also a support effect between the comparatively large surfaces at the outside edge of a chain link and in the inside edge of an adjacent chain link so that the specific pressures in relation to surface area are reduced. That contributes to a reduction in the amount of wear between the pivotal connecting portion and the receiving means for same.

The individual chain links of an energy guide chain slide on a support arrangement, in operation of the assembly. It is also possible for an upper run of an energy guide chain to slide on the lower run thereof. In that situation considerable wear phenomena and also the production of an unpleasant amount of noise may occur. U.S. Pat. No. 5,020,313 discloses an energy guide chain which proposes that releasably secured sliding skids comprising a slidable and low-wear plastics material with good damping properties are arranged at the narrow sides of the chain side plates. The advantage of that configuration of an energy guide chain is that the chain links can be operated optionally with or without sliding skids, depending on the respective situation of use for which the energy guide chain is intended.

Taking that as its basic starting point, the present invention is based on the problem of so developing the chain link that it has functionally adapted regions. A further object of the invention is to provide a process for the production of a chain link, which is simple to carry into effect.

SUMMARY OF THE INVENTION

The above and other objects and advantages of the invention are achieved by the provision of a chain link for an energy conducting guide chain which comprises two spaced apart and parallel side plates composed of a first plastic material and which are connected together by at least one transverse portion. Each chain side plate has a pivotal connecting portion and a receiving means for receiving the pivotal connecting portion, and at least one abutment. The chain link is distinguished by at least one region having an insert which forms at least a part of the surface of the chain link. The insert comprises at least one second plastic material which is different from the first plastic material. The insert is connected to the chain link by way of at least one connecting element in accordance with the multi-component injection molding procedure. The chain link according to the invention has functional regions which are formed by the insert. A suitable selection of a plastic material for the insert can be made in accordance with the requirements on the functional region. The connection of the insert to the chain link is made by way of connecting elements in accordance with the multi-component injection molding procedure, in particular in accordance with the two-component injection molding procedure. That makes it possible to provide for a reliable connection between the insert and the chain link. The multi-component injection molding procedure is a per se known process for the production of plastic parts. The use of a two-component injection molding procedure is known in the field of energy guide chains for the production of flexible transverse webs which provide a locking action for lines guided in an energy guide chain, from DE 195 12 088.

Regarding the configuration of the connecting elements, it is proposed that they are of a substantially web-like or rib-like configuration.

Preferably the connecting elements extend substantially transversely with respect to the force applied to the insert. That configuration for the connecting elements affords the advantage that shearing-off of the insert is reliably prevented, even in consideration of high shearing forces which act on the insert.

In accordance with a further advantageous concept it is proposed that the connecting elements are of a substantially trapezoidal cross-section. As an alternative to a trapezoidal cross-section they may also be of a substantially mushroom-shaped cross-section. That increases the size of the connecting surface between the insert and the chain link. It is also possible for the insert to be of such a configuration, around the chain link, that the connecting line between the chain link and the insert, as considered in cross-section, extends in a corrugated configuration.

In accordance with a further advantageous concept it is proposed that the insert at least partially forms the pivotal connecting portion. In that case the pivotal connecting portion may comprise a low-wear plastic material, in which case it should be borne in mind that the plastic material is also slidable whereby the frictional forces between the pivotal connecting portion and a receiving means for same are reduced.

Besides making the pivotal connecting portion from a second plastic material in the form of an insert for the chain link, the receiving means for the pivotal connecting portion may also be formed by an insert. Suitable pairing of the materials involved, as between the pivotal connecting portion and its receiving means, reduces the wear between them. At the same time high forces can be applied to the pivotal connecting portion and the receiving means therefor so that an energy guide chain which is made up of such chain links can carry greater weights of lines and/or can bridge over greater unsupported lengths.

In accordance with a further advantageous concept it is provided that the chain link has an insert which at least partially forms the surface of an edge extending in the longitudinal direction of at least one chain side plate. That arrangement provides an integral chain link having a sliding skid, which link is easy to produce.

During operation of the energy guide chain the chain side plates of adjacent chain links are pivoted relative to each other about the pivotal connecting portion or portions. Each chain side plate has at least one abutment to limit the angle of pivotal movement. When the abutments of adjacent chain links meet, that results in a not inconsiderable amount of sound being emitted. The abutments are also subjected to a compression loading. In order to ensure that the abutments always permit a defined angle of pivotal movement during operation of the energy guide chain, it is proposed that the insert forms at least in part the surface of an abutment. In that case the insert can comprise a plastic material which has a higher level of resistance to wear than the plastic material of the chain side plate. It is also possible for the insert to be made from a damping plastic material so that the level of sound emission is reduced.

An insert in a chain link forms a functional region of the chain link. The insert may also comprise a plurality of plastic materials. In this respect the structure of the insert is to be adapted to the requirements of the functional region involved. Thus it is also possible for example for the insert to be produced from two plastic materials of different colours so that after one plastic layer is worn away a layer of a plastic material of a different colour becomes visible, whereby a maximum permissible amount of wear of a chain link can be signalled.

For the production of a chain side plate of a chain link of plastic material for an energy guide chain, there is proposed a process in which firstly a first plastic material is introduced into a mold. After removal of a mold insert when the first plastic material has reached a predetermined level of strength, at least one second plastic material is introduced into a space which is left free by the mold insert. In this case the second plastic material is preferably of a higher level of resistance to wear than the first plastic material.

BRIEF DESCRIPTION OF THE DRAWINGS

Further advantages and details of the chain link are described with reference to an embodiment illustrated in the drawing in which.

DETAILED DESCRIPTION OF THE PREFERRED EMBODIMENT

Figure 1:
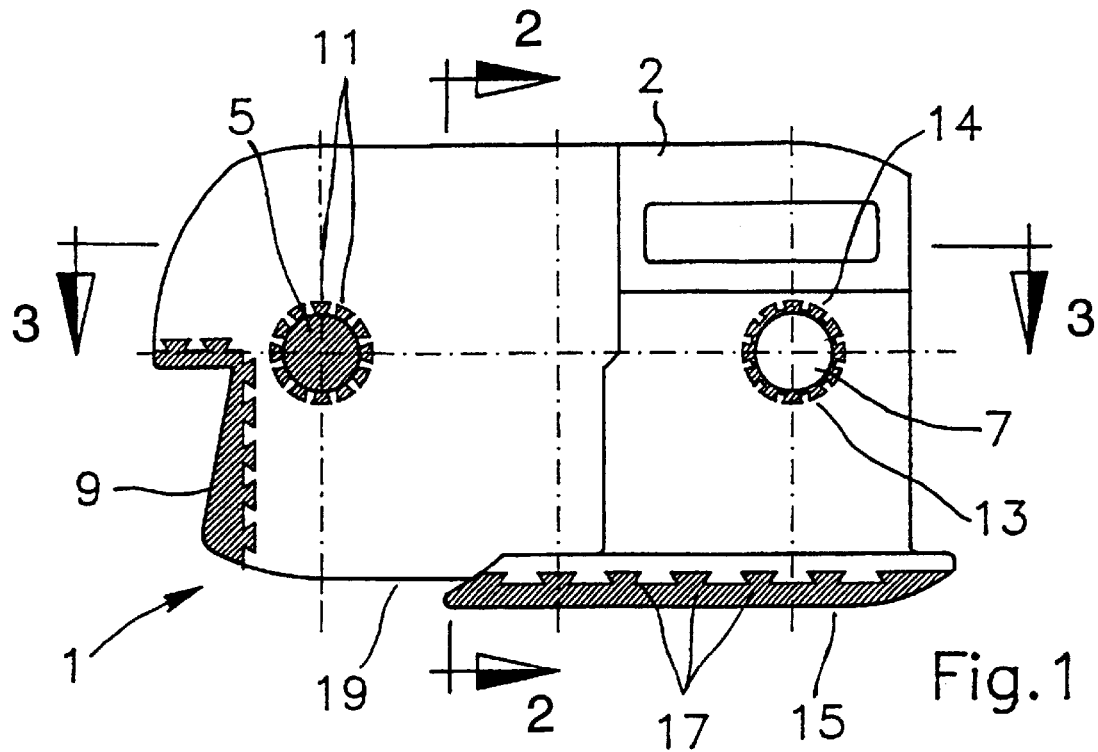
FIG. 1 shows a front view of a chain link.
Figure 2:
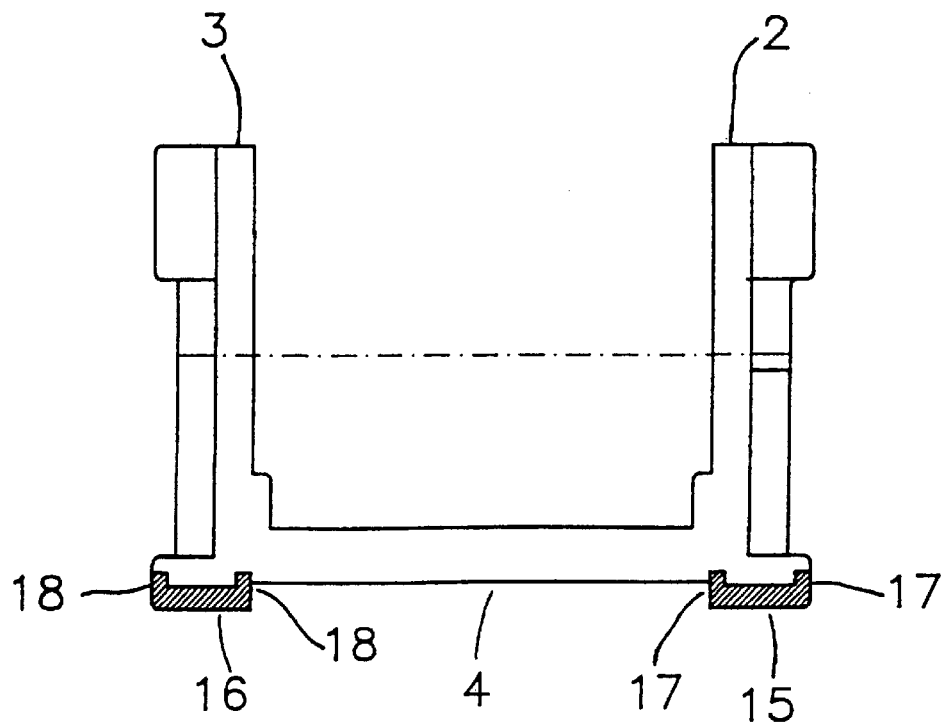
FIG. 2 is a view in section taken along section line 2—2 in FIG. 1.

FIG. 1 shows a chain link 1 of plastic material. The chain link 1 is provided to form an energy guide chain. The chain link has two chain side plates 2, 3 which are connected together by way of a transverse portion 4. As can be seen from FIG. 2 the chain side plates 2, 3 and the transverse portion 4 form an U-shaped chain link. The chain side plates 2, 3 and the transverse portion 4 are formed in one piece. That is not absolutely necessary. The transverse portion 4 can also be releasably connected to the chain side plates 2, 3. Each chain side plate 2, 3 has a respective pivotal connecting portion or post 5 and 6 and a receiving means 7 and 8 for receiving the respective pivotal connecting portions. The pivotal connecting portions 5, 6 and the receiving means 7, 8 of the chain side plates 2, 3 can be seen in the sectional view in FIG. 3. The pivotal connecting portions 5, 6 and the receiving means 7, 8 are of such a configuration that they permit a pivotal connection to be made between adjacent chain links of an energy guide chain. The chain link has abutments to limit an angle of pivotal movement between adjacent chain links. Each side plate 2, 3 has an abutment 9 and 10 respectively. The shape of the abutment 9 and 10 respectively represents a possible embodiment of an abutment.

The chain link 1 according to the invention has regions with inserts which form a part of the surface of the chain link 1. The inserts are of a plastic material which is different from the plastic material of the chain side plate 2, 3. The inserts are connected to the chain link 1 using the two-component injection molding procedure.

The insert forms the pivotal connecting portions 5, 6. The insert is connected to the chain plate 2 and 3 respectively by way of connecting elements 11. The connecting elements 11 are of a rib-like configuration and are of substantially trapezoidal cross-section. As can be seen from FIG. 1 the connecting elements 11 are provided equidistantly relative to each other on the circular periphery of the pivotal connecting portion 5.

Figure 3:
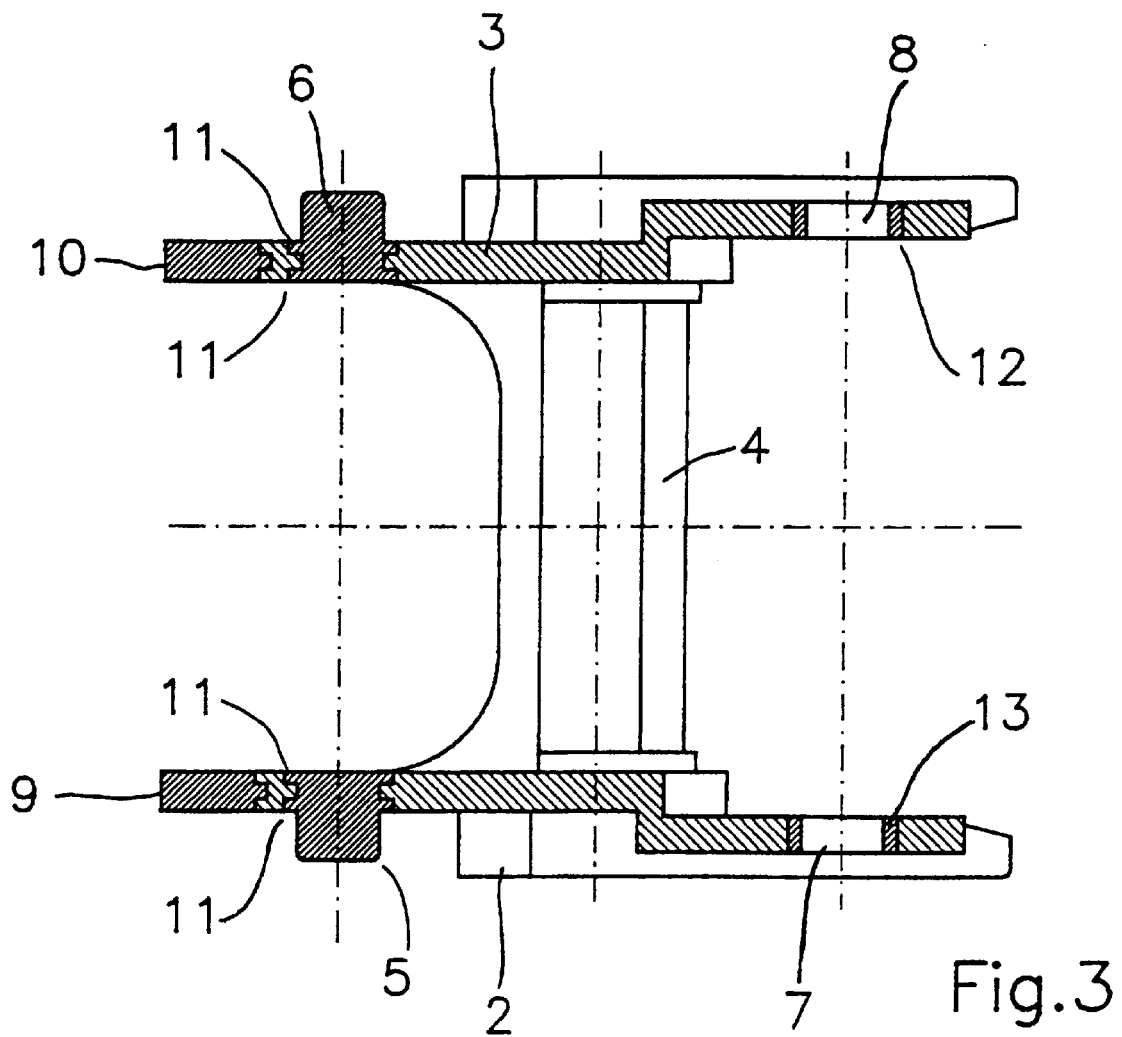
FIG. 3 is a plan view in section taken along line 3—3 in FIG. 1.

In the illustrated embodiment FIG. 3 shows that the connecting elements 11 extend only over a part of the thickness of the chain side plates 2 and 3 respectively in the proximity of the pivotal connecting portions 5, 6. It is also possible for the connecting elements 11 to be provided over the entire thickness of the chain side plates 2 and 3 respectively.

An insert 12 forms the surface of the receiving means 8 for the respective pivotal connecting portion. An insert 13 forms the surface of the receiving means 7 for the respective pivotal connecting portion. The insert 12 or 13 comprises a plastic material which is different from the plastic material of the chain side plate 2, 3. The insert 12 and 13 respectively is connected to the respective chain side plate 2 and 3 by way of connecting elements 14. As can be seen from FIG. 1 in conjunction with FIG. 3 the connecting elements 14 extend over the entire thickness of the respective chain side plates 2 and 3 in the region around the receiving means 7 and 8 for the respective pivotal connecting portions.

The connecting elements 14 are of a rib-like configuration and are of a substantially trapezoidal cross-section.

The chain link 1 has two inserts 15, 16 which form a part of the surface of an edge 19 extending in the longitudinal direction of the chain side plate 2 and 3 respectively. The insert 15 and 16 respectively is connected by way of respective connecting elements 17 and 18 to the respective chain side plate 2 and 3. The inserts 15 and 16 each form a respective sliding skid. As can be seen from FIG. 2 the connecting elements which are of a trapezoidal cross-section extend only over a part of the width of the respective insert 15 and 16.

The inserts may also comprise different plastic materials.

What is claimed is:

1. A chain link for an energy conducting guide chain comprising two spaced apart and parallel side plates each composed of a first plastic material, and each side plate including a pivotal connecting portion, and a receiving portion for receiving a like connecting portion, at least one cross member extending transversely between and interconnecting the two side plates, each side plate having at least one region composed of an insert which forms at least a part of the surface of the chain link, with the insert composed of a second plastic material which is different from the first plastic material and is connected to the associated side plate by interconnecting means, and wherein the interconnecting means comprises a plurality of laterally spaced apart rib-like members integrally attached to the insert and which extend in the transverse direction, and wherein the first plastic material of the associated side plate fills the space between adjacent rib-like members.

2. The chain link as defined in claim 1 wherein the rib-like members are of generally trapezoidal cross-section.

3. The chain link as defined in claim 1 wherein the rib-like members of the insert and the first plastic material of the associated side plate form a connecting line of corrugated configuration in cross-section.

4. The chain link as defined in claim 1 wherein the insert forms the pivotal connecting portion.

5. The chain link as defined in claim 4 wherein the insert also forms the receiving portion.

6. The chain link as defined in claim 5 wherein the insert also forms a skid mounted to extend along an edge surface of the associated side plate.

7. The chain link as defined in claim 6 wherein the insert also forms an abutment surface positioned on an associated side plate so as limit the pivotal movement of the associated side plate with an interconnected side plate.

8. The chain link as defined in claim 1 wherein the second plastic material has a higher level of resistance to wear than the first plastic material.

9. The chain link as defined in claim 1 wherein the second plastic material possesses damping characteristics.

10. A chain link for an energy conducting guide chain comprising
two spaced apart and parallel side plates each composed of a first plastic material,
at least one cross member extending transversely between and interconnecting the two side plates, and
a pivotal connecting post and a receiving sleeve sized to receive a like post mounted to each of said side plates, with said connecting post and said receiving sleeve each being composed of a plastic material which is different from said first plastic material, and with said connecting post and said receiving sleeve each being connected to the associated side plate by laterally spaced apart rib-like members which extend in the transverse direction, and with the first plastic material of the associated side plate filling the space between adjacent rib-like members.

11. The chain link as defined in claim 10 further comprising a skid mounted to extend along an edge surface of each side plate and which is composed of a plastic material which is different from said first plastic material and which is connected to the associated side plate by rib-like members which extend in the transverse direction.

12. The chain link as defined in claim 11 further comprising an abutment surface positioned on each side plate so as to limit the pivotal movement of the associated side plate with an interconnected side plate, and which is composed of a plastic material which is different from said first plastic material and which is connected to the associated side plate by rib-like members which extend in the transverse direction.

13. A method of fabricating at least one of the side plates of a chain link for an energy conducting guide chain which includes two spaced apart and parallel side plates and at least one cross-member extending transversely between and interconnecting the two side plates, with each side plate including a pivotal connecting post and a receiving sleeve sized to receive a like post, and comprising the steps of
introducing a first plastic material into a mold which includes at least one mold insert which is configured in accordance with a component of the one side plate,
removing the mold insert from the mold after the first plastic material has at least partially hardened,
introducing a second plastic material which is different from the first plastic material into the mold to fill the space left open by the removal of the mold insert and so as to form said component of the one side plate.

14. The method as defined in claim 13 wherein said component comprises the pivotal connecting post of said one side plate.

15. The method as defined in claim 14 wherein the mold initially includes a second insert which is configured in accordance with the receiving sleeve of the one side plate, wherein the second mold insert is removed with the first mentioned mold insert, and wherein the second plastic material fills the space left open by the removal of the second mold insert to form the receiving sleeve of the one side plate.

16. The method as defined in claim 15 wherein said first and second mold inserts are each configured to form an interconnection between the pivotal connecting post and the first plastic material and between the receiving sleeve and the first plastic material, with each interconnection comprising a plurality of laterally spaced apart rib-like members.

17. The method as defined in claim 16 wherein the one side plate further comprises a skid mounted to extend along an edge surface thereof, wherein the mold initially includes a third mold insert which is configured in accordance with the skid, wherein the third mold insert is removed with the first and second mold inserts, and wherein the second plastic material fills the space left open by the removal of the third mold insert to form the skid of the one side plate.

18. The method as defined in claim 17 wherein the one side plate further comprises an abutment surface positioned so as to limit the pivotal movement of the one side plate with an interconnected side plate, wherein the mold initially includes a fourth mold insert which is configured in accordance with the abutment surface, wherein the fourth mold insert is removed with the first, second, and third mold inserts, and wherein the second plastic material fills the space left open by the removal of the fourth mold insert to form the abutment surface of the one side plate.

19. A chain link for an energy conducting guide chain comprising
two spaced apart and parallel side plates each composed of a first plastic material, and each side plate including a pivotal connecting portion, and a receiving portion for receiving a like connecting portion,
at least one cross member extending transversely between and interconnecting the two side plates,
each side plate having at least one region composed of an insert which forms at least a part of the surface of the chain link, with the insert composed of a second plastic material which is different from the first plastic material and is connected to the associated side plate by interconnecting means, and wherein the insert forms the pivotal connecting portion and the receiving portion.

20. The chain link as defined in claim 19 wherein the insert also forms a skid mounted to extend along an edge surface of the associated side plate.

21. The chain link as defined in claim 20 wherein the insert also forms an abutment surface positioned on an associated side plate so as limit the pivotal movement of the associated side plate with an interconnected side plate.

22. The chain link as defined in claim 19 wherein the pivotal connecting portion includes a cylindrical post and the receiving portion includes a sleeve which is sized to receive the post.

* * * * *

UNITED STATES PATENT AND TRADEMARK OFFICE
CERTIFICATE OF CORRECTION

PATENT NO.   : 6,173,560 B1                                   Page 1 of 1
DATED        : January 16, 2001
INVENTOR(S)  : Willibald Weber It is certified that error appears in the above-identified patent and that said Letters Patent is hereby corrected as shown below:

Column 3,
Line 63, after "means" insert -- or sleeve --;

Column 6,
Line 65, "surf ace" should read -- surface --.

Signed and Sealed this

Twenty-fifth Day of September, 2001

Attest:

NICHOLAS P. GODICI
Attesting Officer    Acting Director of the United States Patent and Trademark Office